United States Patent
Yu et al.

(10) Patent No.: US 7,035,231 B2
(45) Date of Patent: Apr. 25, 2006

(54) METHOD FOR CONTROLLING OUTER LOOP POWER IN A WCDMA SYSTEM

(75) Inventors: Yao Yu, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 946 days.

(21) Appl. No.: 09/840,433

(22) Filed: Apr. 23, 2001

(65) Prior Publication Data

US 2002/0018453 A1    Feb. 14, 2002

(30) Foreign Application Priority Data

Jul. 1, 2000    (CN) ................................ 00 1 16996

(51) Int. Cl.
*H04B 7/185*    (2006.01)
(52) U.S. Cl. ...................... 370/318; 455/522
(58) Field of Classification Search ................ 370/313, 370/320, 332–334, 323, 335, 342, 311, 318; 455/522–525, 70, 245.1, 69; 714/704; 375/130, 375/295; 706/1
See application file for complete search history.

(56) References Cited

U.S. PATENT DOCUMENTS 5,812,938 A * 9/1998 Gilhousen et al. ............ 455/69
5,963,583 A * 10/1999 Davidovici et al. .......... 375/130
6,154,450 A * 11/2000 Wallentin et al. ............. 370/311
6,259,928 B1 * 7/2001 Vembu ........................ 455/522
6,341,224 B1 * 1/2002 Dohi et al. .................. 455/522
6,415,137 B1 * 7/2002 Hayashi ........................ 455/70
6,490,461 B1 * 12/2002 Muller ......................... 455/522
6,526,261 B1 * 2/2003 Takeuchi et al. .............. 455/69
6,539,213 B1 * 3/2003 Richards et al. .......... 455/226.3
6,549,785 B1 * 4/2003 Agin .......................... 455/522

* cited by examiner

Primary Examiner—Chau Nguyen
Assistant Examiner—Ian N. Moore
(74) Attorney, Agent, or Firm—Vedder, Price, Kaufman & Kammholz P.C.

(57) ABSTRACT

A method for controlling outer loop power in WCDMA system, which includes the following steps of: a) measuring a BER, and calculating an error between measured BER and a target BER and a change of the error; b) determining a degree of the error and a degree of the change of the error; c) calculating a degree of a SNR threshold adjusting step in accordance with the degree of the error and the degree of the change of the error; d) determining an actual SNR threshold adjusting step based on 40 the calculated degree of the SNR threshold adjusting step; and e) adjusting a SNR threshold in accordance with the actual SNR threshold adjusting step. The invention bypasses the determination and implementation of the corresponding function relations between the SNR threshold and the measured BER value by using a fuzzy control method, which is capable of implementing adaptive real-time trace, thereby improves control quality.

19 Claims, 5 Drawing Sheets

METHOD FOR CONTROLLING OUTER LOOP POWER IN A WCDMA SYSTEM

FIELD OF THE INVENTION

The invention relates to a method for controlling the reverse link power in the WCDMA, in particular to a method for controlling outer loop power therein.

BACKGROUND OF THE INVENTION

CDMA is a modulation and multiple access technology based on the spread spectrum communication. The capacity of CDMA-based system is mainly restricted by the interference among mobile stations within the system. As a result, if a signal of the mobile station meets quality requirements of the minimum signal noise ratio (SNR) when it arrives at a base station, the system capacity will be maximized. The purpose of CDMA-based system power control is to maintain high quality communication while minimizing the interference to other subscriber within the same frequency band.

Reverse link power control is also referred to as uplink power control, which adjusts transmission power of a mobile station in real time, so that a signal of the mobile station within a cell just meets the required SNR threshold when it arrives at a receiver of a base station, regardless of the distance from the mobile station to the base station.

The reverse link power control of the WCDMA system includes three aspects: open loop power control, close loop power control and outer loop power control. The open loop power control is used to determine the initial transmission power of the mobile station. The close loop power control, as a main part of the reverse link power control, effects throughout the period in which the communication traffic exists, so as to overcome the fast fading on a radio propagation path. The outer loop power control, as a subsidiary of the close loop power control, adjusts the SNR threshold used in close loop power control according to the quality of the received reverse link signal, so that the power control is directly associated with communication quality instead of merely the improvement of the SNR.

U.S. Pat. No.5,812,938 discloses a method for close loop power control in IS-95 CDMA system. According to the disclosure, the base station periodically measures the SNR of the signal transmitted from the mobile station, compares the measured value with prescribed SNR threshold, generates power control command according to the comparison result, and transmits power control command to the mobile station. The mobile station adjusts its transmission power according to the power control command, so that the SNR of the signal approximates the SNR threshold when the signal arrives at the base station. Since the data at various rates should meet requirements of different bit error rate (BER), it is necessary to set a minimum SNR threshold in respect of each data rate. BER is a common-used measurement of link quality. The lower the BER is, the better the link quality is, and vice versa. Since the actual mobile radio propagation environment is in an ever changing state, and so does the speed of the mobile station, the lowest SNR threshold that meets the link quality requirements will be continuously changed within a certain range. In addition, since it is impossible to find out the corresponding function relation between the SNR threshold and the BER measurement value, the error in SNR measurement will also affect on the control accuracy of the inner loop power control. As a result, it is difficult to control a close loop power based on fixed SNR threshold so as to meet the BER requirements.

A method for controlling reverse link outer loop power in IS-95 CDMA system is disclosed in *Journal of China Institute of Communications*, Vol. 19, No.10, October 1998, Page 60, entitled "An Uplink Power Control Scheme in CDMA Mobile Communication System". The method comprises: a base station measuring Frame Error Rate (FER) of receive reverse channel one time per frame; and adjusting the SNR threshold used for close loop power control with different step with respect to different condition one time per frame according to a comparison result between the measured value and a predetermined FER threshold as well as current frame error condition. Since the SNR threshold is adjusted one time per frame, it changes quicker, thereby resulting in a larger variance of base station receive SNR. This will increase system block rate and degrade system capacity. (Please refer to IEEE Transactions of Vehicular technowlege Vol. 47, No. 2, May 1998, "CDMA Cellular Systems Performance with Fading, Shadowing and Imperfect Power Control").

SUMMARY OF THE INVENTION

An object of the invention is to provide a method for controlling outer loop power in WCDMA system. More particularly, the invention provides a method to adaptively adjust a SNR threshold used for closed loop power control in a base station using fuzzy control theory so as to meet BER requirements of the link according to a comparison result between a measured BER and a given BER in the base station.

The method for controlling outer loop power in WCDMA system according to the invention comprises the following steps of:
 a) measuring a BER, and calculating an error between measured BER and a target BER and a change of the error;
 b) determining a degree of the error and a degree of the change of the error;
 c) calculating a degree of a SNR threshold adjusting step in accordance with the degree of the error and the degree of the change of the error;
 d) determining an actual SNR threshold adjusting step based on the calculated degree of the SNR threshold adjusting step; and
 e) adjusting a SNR threshold in accordance with the actual SNR threshold adjusting step.

DETAILED DESCRIPTION OF THE PREFERRED EMBODIMENTS

The present invention will be further described in conjunction with the Drawings.

Figure 1:
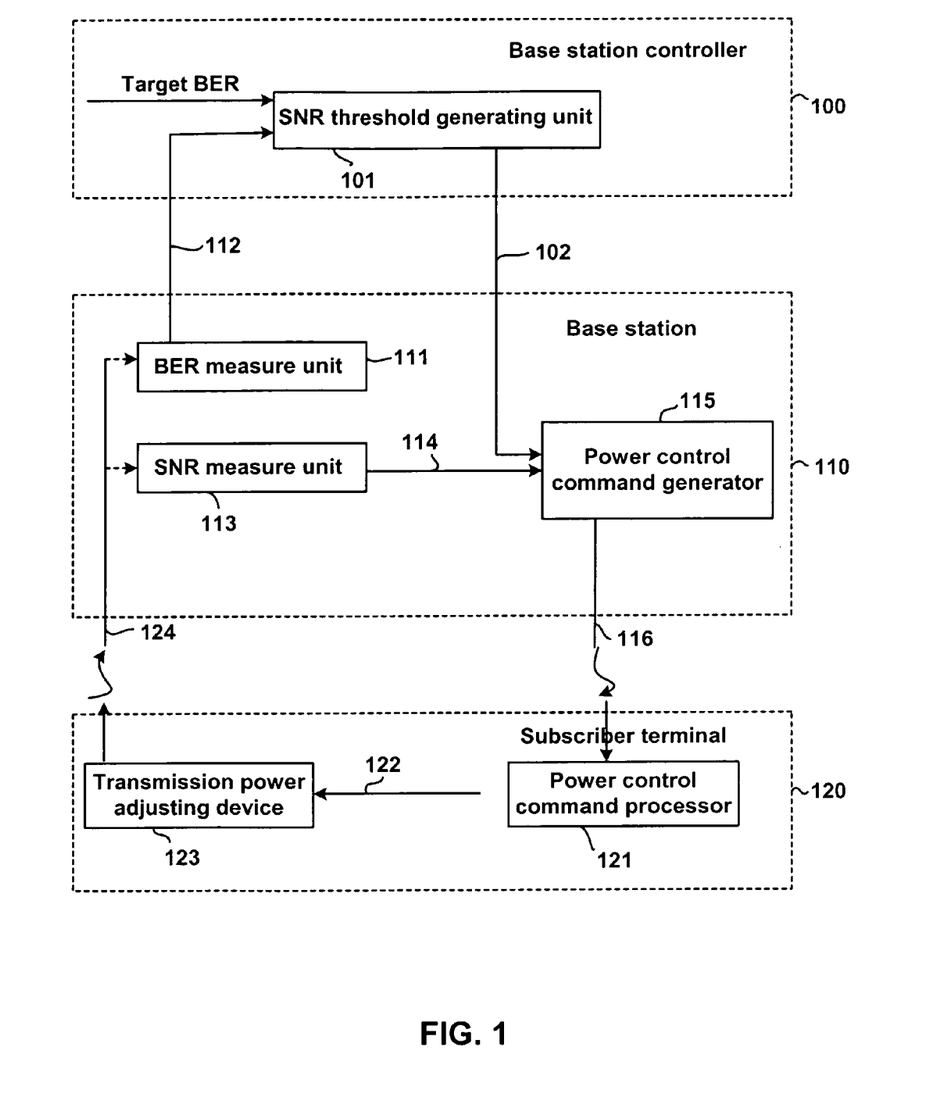
FIG. 1 is a block diagram of a power controlling process in a WCDMA wireless communication system.

FIG. 1 shows a block diagram of a power control process of a WCDMA wireless communication system. As shown in FIG. 1, the WCDMA wireless communication system includes a base station controller 100, a base station 110, and a subscriber terminal 120. In the scheme shown in FIG. 1, the base station controller 100 is connected to the base station 110, and the subscriber terminal 120 is also connected to the base station 110. The subscriber terminal 120 moves within various cells of the system at variable speed.

In the subscriber terminal 120, the components in associating with power control include a power control command processor 121 and a transmission power adjusting device 123. The power control command processor 121 receives a power control command 116 from the base station 110. According to the value of the power control command 116 which may be 1, 0, or −1, the power control command processor 121 sets the power adjusting step 122 as $\Delta_{TPC}$, 0, or $-\Delta_{TPC}$ respectively. The transmission power adjusting device 123 adjusts transmission power according to the power adjusting step 122.

In the base station 110, the components associated with power control include a BER measure unit 111, a SNR measure unit 113, and a power control command generator 115. The SNR measure unit 113 measures a SNR 114 of a data stream 124 sent from the subscriber terminal 120, and forwards it to the power control command generator 115. The power control command generator 115 compares the SNR 114 received from the SNR measure unit 113 with a SNR threshold 102 received from the base station controller 100, then generates the power control command 116 according to the following rules:

If SNR 114>SNR threshold 102, the value of the power control command 116=−1;

If SNR 114<SNR threshold 102, the value of the power control command 116=1;

If SNR 114=SNR threshold 102, the value of the power control command 116=0.

Meanwhile, the BER measure unit 111 periodically measures a BER 112 of the data stream 124 received from the subscriber terminal 120, and forwards it to the base station controller 100.

In the base station controller 100, the components associated with power control are a SNR threshold generating unit 101. The SNR threshold generating unit 101 compares the BER 112 received from the base station 110 with a predetermined target BER, and generates the SNR threshold 102 according to the method shown in FIG. 3, then sends it to the power control command generator 115 of the base station 110.

Figure 2:
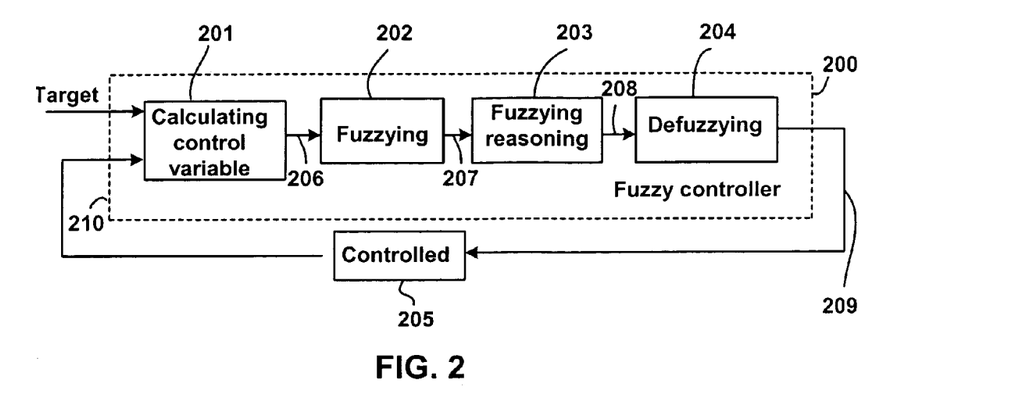
FIG. 2 is a schematic block diagram of the fuzzy control theory used in the outer loop power control method according to the invention.

FIG. 2 shows a basic schematic diagram of the fuzzy control theory of automatic control field adopted in the invention, in which a core portion is a fuzzy controller 200 indicated by the dashed line block. The fuzzy control algorithm can be summarized as the following steps of:

calculating control variable 201 including calculating an accurate value 206 of selected input variable of the system according to an output value 210 of a controlled object 205 obtained by the current sampling and a target value;

fuzzifying 202 including converting the accurate value 206 of the input variable into a fuzzy value 207;

fuzzy reasoning 203 including calculating a fuzzy value 208 of the control variable with fuzzy reasoning synthesize rules according to the fuzzy value 207 of the input variable; and defuzzifying 204 including calculating an accurate value 209 of the control variable from the above-obtained fuzzy value 208 of the control variable, and finally sending it to the controlled object 205.

Figure 3:
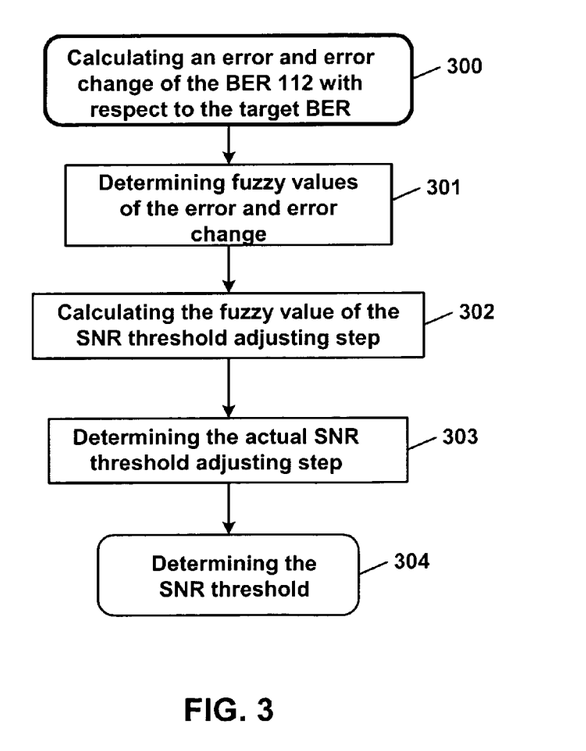
FIG. 3 is a flow chart of the outer loop power control method in the WCDMA wireless communication system according to the invention.

FIG. 3 is an embodiment of FIG. 2, showing a flow chart of the outer loop power control performed by the SNR threshold generating unit 101 adopting the fuzzy control theory. The logic flow begins at step 300, corresponding to the step for calculating control variable 201 of FIG. 2. After receiving a measured BER value 112 sent from the base station 110 and a target BER, the SNR threshold generating unit 101 performs the following steps to obtain an error and an error change of the BER 112 with respect to the target BER:

If BER 112=0, then error=−10;

If BER 112≠0, then error=log 10 (BER 112/target BER);

Error change=current calculated error—previous calculated error.

Considering that it is more reasonable to characterize the BER error by difference of order of magnitude rather than by absolute difference, herein the logarithm operation is performed on BER.

At step 301, corresponding to fuzzifying 202, the SNR threshold generating unit 101 determines fuzzy values of the error and the error change. According to the fuzzy theory, it is common to classify a kind of item into three degrees. For instance, the size of a object is classified as large, medium, small; the speed is classified as fast, medium, slow; the height of a person classified as tall, medium, short, and so on. As a result, the fuzzy quantity terms "large, middle, small" can be selected to describe the state of an accurate quantity. Since the human's judgment is usually symmetric in positive and negative directions, taking the large, middle, small and the positive and negative directions as well as the zero state together into consideration, seven states, i.e. {negative large, negative middle, negative small, zero, positive small, positive middle, positive large}, can be obtained. These states are represented by corresponding numbers as fuzzy value, i.e. {−3, −2, −1, 0, 1, 2, 3}. Although a further division may be made, the complexity is also increased. The numeric range of the error and the error change corresponding to each fuzzy value are determined based on actual circumstances. In the present invention, it is considered that a range of −3 to +3 covers all possible values of the error and the error change. In a preferred embodiment of the invention, the corresponding relation between the accurate values and the fuzzy values of the error and the error change are shown in Table 1 below:

TABLE 1

| Fuzzy Value | −3 | −2 | −1 | 0 | 1 | 2 | 3 |
|---|---|---|---|---|---|---|---|
| Error | <−0.7 | [−0.7, −0.3] | [−0.3, −0.05] | [−0.05, 0.05] | [0.05, 0.3] | [0.3, 0.7] | >0.7 |
| Error Change | <−0.7 | [−0.7, −0.3] | [−0.3, −0.1] | [−0.1, 0.1] | [0.1, 0.3] | [0.3, 0.7] | >0.7 |

Step 302 corresponds to fuzzy reasoning 203 in FIG. 2, calculating the fuzzy value of the SNR threshold adjusting step. The numeric range of the fuzzy value of the SNR threshold adjusting step is also defined as {−3, −2, −1, 0, 1, 2, 3}. The value of the adjusting step is dependent on the error and the error change. Therefore, the control strategy may be described by the following statements:

If the actually measured BER is very low (i.e. the error is negative large, the fuzzy value is −3) and it keeps on decreasing sharply (i.e. the error change is negative large, the fuzzy value is −3), the BER of the present link is far less than the target BER and tends to keep on decreasing greatly. Thus, the SNR threshold should be decreased greatly (i.e. the SNR threshold adjusting step is negative large, the fuzzy value is −3), so as to increase the BER quickly.

If the actually measured BER is very high (i.e. the error is positive large, the fuzzy value is 3) and it keeps on increasing sharply (i.e. the error change is positive large, the fuzzy value is 3), the BER of the present link is far more than the target BER and tends to keep on increasing greatly, then the SNR threshold should be increased greatly (i.e. the SNR threshold adjusting step is positive large, the fuzzy value is 3), so as to decrease the BER quickly.

The above analysis is concluded as the following equations:

if |error degree| ≱ 2, SNR threshold adjusting step degree=int($a_1$*error degree+(1−$a_1$)*error change degree);

if |error degree| ≧ 2, SNR threshold adjusting step degree=int($a_2$*error degree+(1−$a_2$)*error change degree);

in which, int(x) denotes rounding, $a_1$, $a_2$ are adjustable coefficients (0≦$a_1$≦$a_2$≦1) respectively representing the error weight when the error is smaller or larger. When the error is larger, the process should be focused on the elimination of the error, in the case, the error weight should be larger, when the error is smaller, the process should be focused on the smoothing of the error change. The error weight should be smaller. In the preferred embodiment of the invention, $a_1$ is 05, $a_2$ is 0.7.

Thereafter at step 303, in correspondence with the defuzzyfying 204 of FIG. 2, the SNR threshold generating unit 101 determines the actual SNR threshold adjusting step according to the calculated fuzzy value of the SNR threshold adjusting step. The actual SNR threshold adjusting step corresponding to the fuzzy value should be determined by experiences. In the preferred embodiment of the invention, the corresponding relation between the fuzzy value and the actual value of the SNR threshold adjusting step are shown in the Table 2 below:

TABLE 2

| Fuzzy value | −3 | −2 | −1 | 0 | 1 | 2 | 3 |
|---|---|---|---|---|---|---|---|
| SNR adjusting step | −0.6 | −0.3 | −0.1 | 0 | 0.1 | 0.3 | 0.6 |

Finally, at step 304, the SNR threshold generating unit 101 determines the SNR threshold 102 according to the following equations:

temporary SNR threshold=SNR threshold adjusting step+previous calculated SNR threshold;

if temporary SNR threshold>predetermined upper limit, SNR threshold=predetermined upper limit;

if temporary SNR threshold predetermined lower limit, SNR threshold=predetermined lower limit; and else SNR threshold=temporary SNR threshold.

Figure 4:
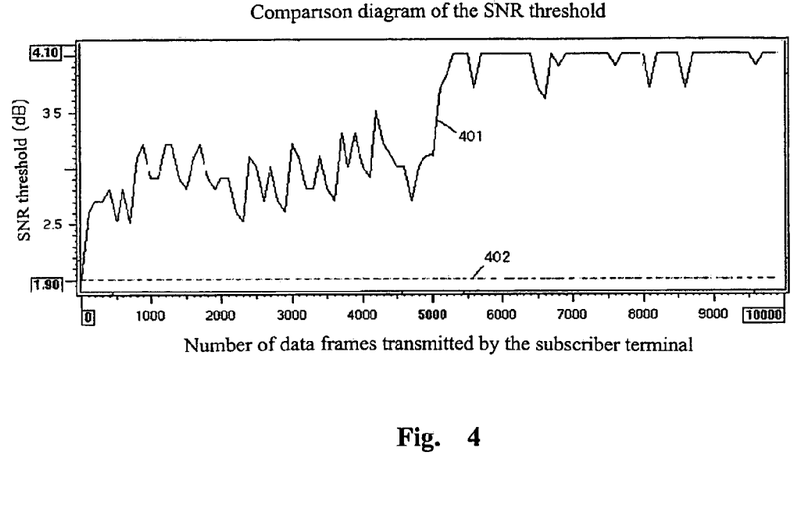
FIG. 4 is a comparison diagram between the SNR threshold recorded by a base station in a preferred embodiment of the invention and a fixed SNR threshold of 2 dB in the U.S. Pat. No. 5,812,938.

FIG. 4 is a comparison diagram of the SNR threshold recorded by the base station controller 100 of the preferred embodiment of the invention and the fixed SNR threshold of 2 dB of U.S. Pat. No. 5,812,938, in a extreme condition that the BER threshold is $10^{-3}$, and the moving speed of the subscriber terminal has changed in halfway (i.e. after the subscriber terminal has transmitted data of 5000 frames) from 120 km/h to 30 km/h. In the figure, the line 401 indicates the SNR threshold applied the invention and the line 402 indicates the SNR threshold applied the US patent.

Figure 5:
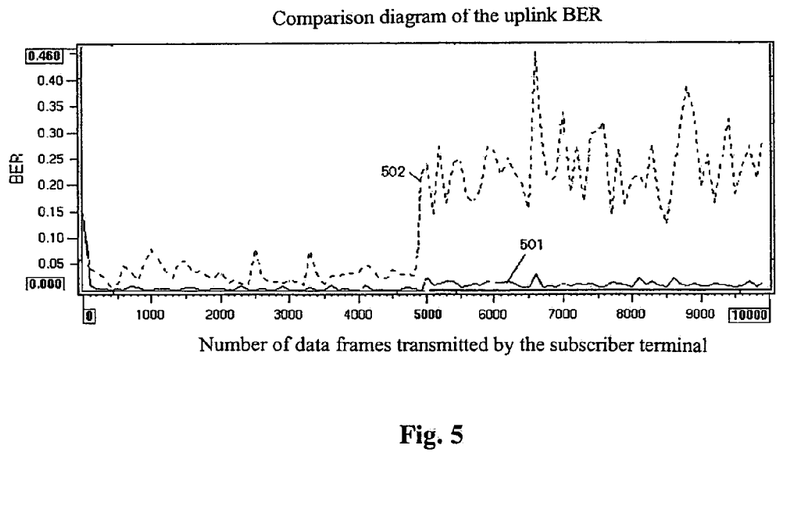
FIG. 5 is comparison diagram between the uplink (i.e. the signal is transmitted from a subscriber terminal to a base station) BER measured by a base station in one preferred embodiment of the invention and that measured by the device of the U.S. Pat. No. 5,812,938.

FIG. 5 is a comparison diagram of the uplink (i.e. the signal is transmitted from a subscriber terminal to the base station) BER measured by the base station 110 of the preferred embodiment of the invention and the uplink BER measured by the device of the U.S. Pat. No. 5,812,938, with the SNR threshold shown in FIG. 4, in a extreme condition that the BER threshold is $10^{-3}$, and the moving speed of the subscriber terminal changed halfway (i.e. after the subscriber terminal has transmitted data of 5000 frames) from 120 km/h to 30 km/h. In the figure, the line 501 indicates the measured BER applied the invention and the line 502 indicates the measured BER applied the U.S. patent.

Taking FIGS. 4 and 5 together, since the speed of the subscriber terminal changes greatly, which causes the SNR threshold that meets the channel performance requirements to change greatly, the U.S. Pat. No. 5,812,938 cannot guarantee link quality with the SNR threshold 402 shown in FIG. 4 due to lacking of SNR threshold adjust mechanism, so that the uplink BER 502 measured in FIG. 5 increases sharply when the subscriber terminal speed changes. On the contrary, the invention can adjust SNR threshold by using outer loop power control, so that the SNR threshold 401 adaptively increases to a level necessary to guarantee the link quality when the subscriber terminal speed changes. Therefore, the measured unlink BER 501 can be approximately maintained at a required level.

Figure 6:
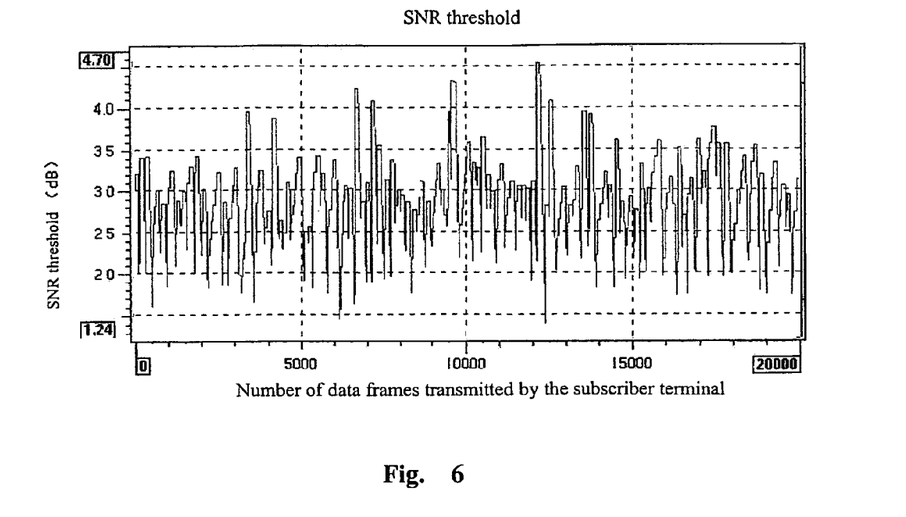
FIG. 6 is a SNR threshold recorded by a method in the paper entitled "Uplink Power Control Scheme in CDMA Mobile Communication System"

FIG. 6 is the SNR threshold recorded by the method according to the paper entitled "An Uplink Power Control Scheme in CDMA Mobile Communication System", in a condition that the BER threshold is $10^{-3}$, and the moving speed of the subscriber terminal is 120 km/h. As shown in the FIG. 6, according to the method disclosed in the thesis, the adjustment of the SNR threshold is over frequent and changing amplitude is rather large, which will certainly influence system capacity.

Figure 7:
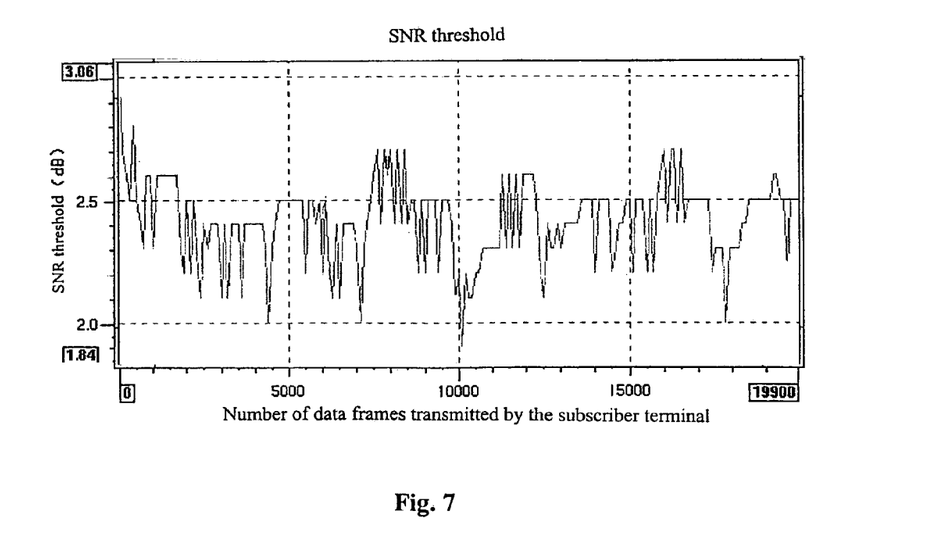
FIG. 7 is a SNR threshold recorded by the base station of the preferred embodiment of the invention in the same wireless environment as in FIG. 6.

FIG. 7 is the SNR threshold recorded by the base station controller 100 of the preferred embodiment of the invention, in a condition that the BER threshold is $10^{-3}$, and the moving speed of the subscriber terminal is 120 km/h. In contrast to FIG. 6, the adjust frequency to the SNR threshold by the method of the invention is lower than that of the paper entitled "An Uplink Power Control Scheme in CDMA Mobile Communication System", and the changing amplitude is smaller, which appropriately shows that the outer loop power control is an efficient means for the control of long-term quality control means of the radio link.

Figure 8:
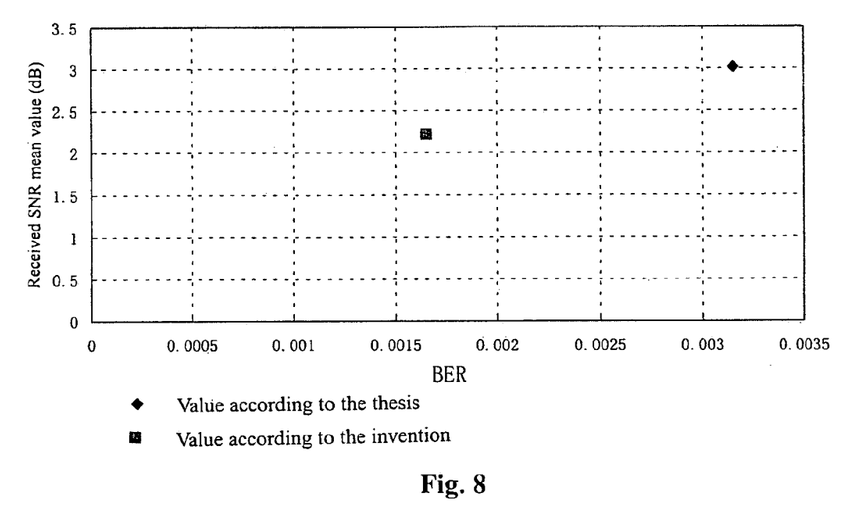
FIG. 8 is a comparison diagram between the uplink receiving SNR mean and BER measured by a base station of another embodiment of the invention and the uplink receive SNR mean and BER measured by the method according to the paper titled "An Uplink Power Control Scheme in CDMA Mobile Communication System".

FIG. 8 is a comparison diagram of the uplink received SNR mean value and BER measured by the base station 110 of the preferred embodiment of the invention and the uplink received SNR mean value and BER measured by the method according to the paper entitled "An Uplink Power Control Scheme in CDMA Mobile Communication System ", in a condition that the BER threshold is $10^{-3}$, and the moving speed of the subscriber terminal is 120 km/h. Under totally equivalent radio propagation environment, compared with the method of the paper entitled "An Uplink Power Control Scheme in CDMA Mobile Communication System ", the preferred embodiment of the invention obtains lower received BER with lower received SNR mean value, in another word, makes the subscriber terminal obtaining lower received BER with lower and more reliable transmission power, which shows that the invention has an obviously composed performance than the method of the paper entitled "An Uplink Power Control Scheme in CDMA Mobile Communication System".

Since a main advantage of fuzzy control is that only a simulation of human beings' decision making manner is required to implement the control, without the necessity to know the corresponding function relations between the control variable and the controlled object. Therefore, the invention bypasses the determination and implementation of the corresponding function relations between the SNR threshold and the measured BER value by using a fuzzy control method, is capable of implementing adaptive real-time trace, thereby improves control quality.

We claim:

1. A method for controlling outer loop power, comprising the following steps of:
   a) measuring a BER, and calculating an error between measured BER and a target BER and a change value of the error;
   b) determining a fuzzy value of the error and a fuzzy value of the change of the error;
   c) calculating a fuzzy value of a SNR threshold adjusting step value in accordance with the fuzzy value of the error and the fuzzy value of the change of the error;
   d) determining an actual SNR threshold adjusting step value based on the calculated fuzzy value of the SNR threshold adjusting step value; and
   e) adjusting a SNR threshold in accordance with the actual SNR threshold adjusting step value.

2. The method for controlling outer loop power as claimed in claim 1, wherein said step a) is performed as follows:
   the error is −10, when measured BER=0;
   the error is log10 (measured BER/target BER), when measured BER≠0; and
   the change of the error is a current calculated error minus a previous calculated error.

3. The method for controlling outer loop power as claimed in claim 1, wherein the fuzzy value of the error and the fuzzy value of the change of the error in said step b) are determined by a table below:

| Fuzzy value | −3 | 2 | −1 | 0 | 1 | 2 | 3 |
|---|---|---|---|---|---|---|---|
| Error | <−0.7 | [−0.7, −0.3] | [−0.3, −0.05] | [−0.05, 0.05] | [0.05, 0.3] | [0.3, 0.7] | >0.7 |
| change of error | <−0.7 | [−0.7, −0.3] | [−0.3, −0.1] | [−0.1, 0.1] | [0.1, 0.3] | [0.3, 0.7] | >0.7 |

4. The method for controlling outer loop power as claimed in claim 2, wherein the fuzzy value of the error and the fuzzy value of the variance value of the error in said step b) are determined by a table below:

| fuzzy value | −3 | −2 | −1 | 0 | 1 | 2 | 3 |
|---|---|---|---|---|---|---|---|
| error | <−0.7 | [−0.7, −0.3] | [−0.3, −0.05] | [−0.05, 0.05] | [0.05, 0.3] | [0.3, 0.7] | >0.7 |
| change of error | <−0.7 | [−0.7, −0.3] | [−0.3, −0.1] | [−0.1, 0.1] | [0.1, 0.3] | [0.3, 0.7] | >0.7 |

5. The method for controlling outer loop power as claimed in claim 1, wherein said step c) is performed in accordance with the following equations;

if |error fuzzy value|<2, SNR threshold adjusting step
fuzzy value=int($a_1$,* error fuzzy value+(1−$a_1$)
*error change fuzzy value grade); and if |error fuzzy value| ≧2, SNR threshold adjusting
step fuzzy value=int($a_2$* error fuzzy value+(1−
$a_2$)*error change fuzzy value), wherein, int(x) denotes rounding, and both $a_1$ and $a_2$ are adjustable coefficients and meet the following requirement:

$$0 \leq a_1 \leq a_2 \leq <1.$$

6. The method for controlling outer loop power as claimed in claim 3, wherein said step c) is performed in accordance with the following equations:

if |error fuzzy value|≦2, SNR threshold adjusting
step fuzzy value=int($a_1$* error fuzzy value+(1−
$a_1$) *error change fuzzy value); and if |error fuzzy value| ≧2, SNR threshold adjusting
step fuzzy value=int($a_2$* error fuzzy value+(1−
$a_2$) *error change fuzzy value), wherein, int(x) denotes rounding, and both $a_1$ and $a_2$ are adjustable coefficients and meet the following requirement:

$$0 \leq a_1 \leq a_2 \leq 1.$$

7. The method for controlling outer loop power as claimed in claim 4, wherein said step c) is performed in accordance with the following equations:

if |error fuzzy value |<2, SNR threshold adjusting
step fuzzy value=int($a_1$*error fuzzy value+(1−
$a_1$) *error change fuzzy value); and if |error fuzzy value≧2, SNR threshold adjusting
step fuzzy value=int($a_2$* error fuzzy value+(1−
$\alpha_2$) *error change fuzzy value), wherein, int(x) denotes rounding, and both $a_1$ and $a_2$ are adjustable coefficients and meet the following requirement:

$$0 \leq a_1 \leq a_2 < 1.$$

8. The method for controlling outer loop power as claimed in claim 5, wherein $a_1$ is 0.5 and $a_2$ is 0.7.

9. The method for controlling outer loop power as claimed in claim 6, wherein $a_1$ is 0.5 and $a_2$ is 0.7.

10. The method for controlling outer loop power as claimed in claim 7, wherein $a_1$ is 0.5 and $a_2$ is 0.7.

11. The method for controlling outer loop power as claimed in claim 1, wherein in step d), the actual SNR adjusting step value threshold is determined according to the fuzzy value of SNR threshold adjusting step value as shown in the following table:

| fuzzy value of SNR threshold adjusting step value | −3 | −2 | −1 | 0 | 1 | 2 | 3 |
|---|---|---|---|---|---|---|---|
| actual SNR threshold adjusting step value. | −0.6 | −0.3 | −0.1 | 0 | 0.1 | 0.3 | 0.6 |

12. The method for controlling outer loop power as claimed in claim 5, wherein in step d), the actual SNR adjusting step threshold is determined according to the fuzzy value of SNR threshold adjusting step value as shown in the following table:

| fuzzy value of SNR threshold adjusting step value | −3 | −2 | −1 | 0 | 1 | 2 | 3 |
|---|---|---|---|---|---|---|---|
| Actual SNR threshold adjusting step value. | −0.6 | −0.3 | −0.1 | 0 | 0.1 | 0.3 | 0.6 |

13. The method for controlling outer loop power as claimed in claim 6, wherein in step d), the actual SNR adjusting step value threshold is determined according to the fuzzy value of SNR threshold adjusting value step as shown in the following table:

| fuzzy value of SNR threshold adjusting step value | −3 | −2 | −1 | 0 | 1 | 2 | 3 |
|---|---|---|---|---|---|---|---|
| actual SNR threshold adjusting step value. | −0.6 | −0.3 | −0.1 | 0 | 0.1 | 0.3 | 0.6 |

14. The method for controlling outer loop power as claimed in claim 7, wherein in step d), the actual SNR adjusting step value threshold is determined according to the fuzzy value of SNR threshold adjusting step value as shown in the following table:

| fuzzy value of SNR threshold adjusting step value | −3 | −2 | −1 | 0 | 1 | 2 | 3 |
|---|---|---|---|---|---|---|---|
| actual SNR threshold adjusting step value. | −0.6 | −0.3 | −0.1 | 0 | 0.1 | 0.3 | 0.6 |

15. The method for controlling outer loop power as claimed in claim 1, wherein in step e), the SNR threshold is adjusted by the following steps of:

i) calculating a temporary SNR threshold in accordance with the following equation:

temporary SNR threshold=SNR threshold adjusting step value +previous SNR threshold; and ii) determining a SNR threshold according to the temporary SNR threshold calculated in step i):

SNR threshold=predetermined upper limit when temporary SNR threshold>predetermined upper limit;

SNR threshold=predetermined lower limit when temporary SNR threshold<predetermined lower limit; and else SNR threshold=temporary SNR threshold.

16. The method for controlling outer loop power as claimed in claim 11, wherein in step e), the SNR threshold is adjusted by the following steps of:

i) calculating a temporary SNR threshold in accordance with the following equation:

temporary SNR threshold=SNR threshold adjusting step value+previous SNR threshold; and ii) determining a SNR threshold according to the temporary SNR threshold calculated in step i):

SNR threshold predetermined upper limit when temporary SNR threshold>predetermined upper limit;

SNR threshold=predetermined lower limit when temporary SNR threshold<predetermined lower limit; and else SNR threshold=temporary SNR threshold.

17. The method for controlling outer loop power as claimed in claim 12, wherein in step e), the SNR threshold is adjusted by the following steps of:

i) calculating a temporary SNR threshold in accordance with the following equation:

temporary SNR threshold=SNR threshold adjusting step value+previous SNR threshold; and ii) determining a SNR threshold according to the temporary SNR threshold calculated in step i):

SNR threshold=predetermined upper limit when temporary SNR threshold>predetermined upper limit;

SNR threshold=predetermined lower limit when temporary SNR threshold<predetermined lower limit; and else SNR threshold=temporary SNR threshold.

18. The method for controlling outer loop power as claimed in claim 13, wherein in step e), the SNR threshold is adjusted by the following steps of:

i) calculating a temporary SNR threshold in accordance with the following equation:

temporary SNR threshold=SNR threshold adjusting step value+previous SNR threshold; and ii) determining a SNR threshold according to the temporary SNR threshold calculated in step i):

SNR threshold=predetermined upper limit when temporary SNR threshold>predetermined upper limit;

SNR threshold=predetermined lower limit when temporary SNR threshold<predetermined lower limit; and else SNR threshold=temporary SNR threshold.

19. The method for controlling outer loop power as claimed in claim 14, wherein in step e), the SNR threshold is adjusted by the following steps of:
   i) calculating a temporary SNR threshold in accordance with the following equation:

temporary SNR threshold=SNR threshold adjusting step value+previous SNR threshold; and ii) determining a SNR threshold according to the temporary SNR threshold calculated in step i):

SNR threshold=predetermined upper limit when temporary SNR threshold >predetermined upper limit;

SNR threshold=predetermined lower limit when temporary SNR threshold <predetermined lower limit; and else SNR threshold=temporary SNR threshold.

* * * * *